(12) United States Patent
Ayush et al.

(10) Patent No.: US 11,640,634 B2
(45) Date of Patent: May 2, 2023

(54) DEEP LEARNING BASED VISUAL COMPATIBILITY PREDICTION FOR BUNDLE RECOMMENDATIONS

(71) Applicant: ADOBE INC., San Jose, CA (US)

(72) Inventors: Kumar Ayush, Stanford, CA (US); Ayush Chopra, Delhi (IN); Patel Utkarsh Govind, Gujarat (IN); Balaji Krishnamurthy, Uttar Pradesh (IN); Anirudh Singhal, Uttar Pradesh (IN)

(73) Assignee: ADOBE INC.

( * ) Notice: Subject to any disclaimer, the term of this patent is extended or adjusted under 35 U.S.C. 154(b) by 234 days.

(21) Appl. No.: 16/865,572

(22) Filed: May 4, 2020

(65) Prior Publication Data
US 2021/0342701 A1 Nov. 4, 2021

(51) Int. Cl.
| | |
|---|---|
| *G06N 3/00* | (2006.01) |
| *G06N 3/088* | (2023.01) |
| *G06N 3/04* | (2023.01) |
| *G06K 9/62* | (2022.01) |
| *G06Q 30/0601* | (2023.01) |

(52) U.S. Cl.
CPC .......... *G06N 3/088* (2013.01); *G06K 9/6256* (2013.01); *G06K 9/6265* (2013.01); *G06N 3/0454* (2013.01); *G06Q 30/0631* (2013.01)

(58) Field of Classification Search
CPC .... G06N 3/088; G06N 3/0454; G06N 3/0445; G06K 9/6256; G06K 9/6265; G06K 9/6274; G06Q 30/0631; G06V 10/454; G06V 10/82; G06V 20/00
See application file for complete search history.

(56) References Cited

U.S. PATENT DOCUMENTS

2018/0121988 A1* 5/2018 Hiranandani ......... G06F 16/583
2020/0160154 A1* 5/2020 Taslakian ................ G06N 3/08

OTHER PUBLICATIONS

Nakamura et al, Outfit Generation and Style Extraction via Bidirectional LSTM and Autoencoder, arXiv:1807.03133v3 (Year: 2018).*
Wikipedia, Reinforcement learning (Year: 2022).*
Cui et al, Dressing as a whole: Outfit compatibility learning based on node-wise graph neural networks, WWW '19, May 13-17, San Francisco, CA, USA, pp. 307-317. (Year: 2019).*

(Continued)

*Primary Examiner* — Nancy Bitar
*Assistant Examiner* — Xiao Liu
(74) *Attorney, Agent, or Firm* — Shook, Hardy & Bacon L.L.P.

(57) ABSTRACT

Systems, methods, and computer storage media are disclosed for predicting visual compatibility between a bundle of catalog items (e.g., a partial outfit) and a candidate catalog item to add to the bundle. Visual compatibility prediction may be jointly conditioned on item type, context, and style by determining a first compatibility score jointly conditioned on type (e.g., category) and context, determining a second compatibility score conditioned on outfit style, and combining the first and second compatibility scores into a unified visual compatibility score. A unified visual compatibility score may be determined for each of a plurality of candidate items, and the candidate item with the highest unified visual compatibility score may be selected to add to the bundle (e.g., fill the in blank for the partial outfit).

20 Claims, 7 Drawing Sheets

(56) References Cited

OTHER PUBLICATIONS

Zoph et al, Neural network architecture search with reinforcement learning, arXiv:1611,01578v2 (Year: 2017).*

Singhal, A., Chopra, A., Ayush, K., Govind, U. P., & Krishnamurthy, B. (2020). Towards a Unified Framework for Visual Compatibility Prediction. In The IEEE Winter Conference on Applications of Computer Vision (pp. 3607-3616).

Ak, K. E., Kassim, A. A., Hwee Lim, J., & Yew Tham, J. (2018). Learning attribute representations with localization for flexible fashion search. In Proceedings of the IEEE Conference on Computer Vision and Pattern Recognition (pp. 7708-7717).

Ayush, K. (2019). Context aware recommendations embedded in augmented viewpoint to retarget consumers in v-commerce. In CVPR Workshop on Computer Vision for Augmented and Virtual Reality (vol. 2).

Ayush, K., Jandial, S., Chopra, A., Hemani, M., & Krishnamurthy, B. (2019). Robust Cloth Warping via Multi-Scale Patch Adversarial Loss for Virtual Try-On Framework. In Proceedings of the IEEE International Conference on Computer Vision Workshops (pp. 0-0).

Ayush, K., Jandial, S., Chopra, A., & Krishnamurthy, B. (2019). Powering Virtual Try-On via Auxiliary Human Segmentation Learning. In Proceedings of the IEEE International Conference on Computer Vision Workshops (pp. 0-0).

P. Baldi. Autoencoders, unsupervised learning and deep architectures. In Proceedings of the 2011 International Conference on Unsupervised and Transfer Learning Workshop—vol. 27, UTLW'11, pp. 37-50. JMLR.org, 2011.

Bello, I., Zoph, B., Vasudevan, V., & Le, Q. V. (Aug. 2017). Neural optimizer search with reinforcement learning. In Proceedings of the 34th International Conference on Machine Learning—vol. 70 (pp. 459-468). JMLR.org.

Chopra, A., Sinha, A., Gupta, H., Sarkar, M., Ayush, K., & Krishnamurthy, B. (2019). Powering Robust Fashion Retrieval With Information Rich Feature Embeddings. In Proceedings of the IEEE Conference on Computer Vision and Pattern Recognition Workshops (pp. 0-0).

Cucurull, G., Taslakian, P., & Vazquez, D. (2019). Context-aware visual compatibility prediction. In Proceedings of the IEEE Conference on Computer Vision and Pattern Recognition (pp. 12617-12626).

Cui, Z., Li, Z., Wu, S., Zhang, X. Y., & Wang, L. (May 2019). Dressing as a whole: Outfit compatibility learning based on node-wise graph neural networks. In The World Wide Web Conference (pp. 307-317).

Dong, Haoye, et al. "Towards multi-pose guided virtual try-on network." Proceedings of the IEEE International Conference on Computer Vision. 2019.

Gcucurull. Code for Context Aware Fashion Compatibility. Retrieved from the Internet on Apr. 20, 2020 from URL <https://github.com/gcucurull/visual-compatibility>.

Hadi Kiapour, M., Han, X., Lazebnik, S., Berg, A. C., & Berg, T. L. (2015). Where to buy it: Matching street clothing photos in online shops. In Proceedings of the IEEE international conference on computer vision (pp. 3343-3351).

Han, X., Wu, Z., Jiang, Y. G., & Davis, L. S. (Oct. 2017). Learning fashion compatibility with bidirectional lstms. In Proceedings of the 25th ACM international conference on Multimedia (pp. 1078-1086).

Han, X., Wu, Z., Wu, Z., Yu, R., & Davis, L. S. (2018). Viton: An image-based virtual try-on network. In Proceedings of the IEEE conference on computer vision and pattern recognition (pp. 7543-7552).

He, K., Zhang, X., Ren, S., & Sun, J. (2016). Deep residual learning for image recognition. In Proceedings of the IEEE conference on computer vision and pattern recognition (pp. 770-778).

Hsiao, W. L., & Grauman, K. (2018). Creating capsule wardrobes from fashion images. In Proceedings of the IEEE Conference on Computer Vision and Pattern Recognition (pp. 7161-7170).

Kang, W. C., Fang, C., Wang, Z., & McAuley, J. (Nov. 2017). Visually-aware fashion recommendation and design with generative image models. In 2017 IEEE International Conference on Data Mining (ICDM) (pp. 207-216). IEEE.

Kingma, Diederik P., and Jimmy Ba. "Adam: A method for stochastic optimization." arXiv preprint arXiv:1412.6980 (2014).

Kipf, Thomas N., and Max Welling. "Semi-supervised classification with graph convolutional networks." arXiv preprint arXiv:1609.02907 (2016).

Liu, Z., Luo, P., Qiu, S., Wang, X., & Tang, X. (2016). Deepfashion: Powering robust clothes recognition and retrieval with rich annotations. In Proceedings of the IEEE conference on computer vision and pattern recognition (pp. 1096-1104).

Mahajan, K., Khurana, T., Chopra, A., Gupta, I., Arora, C., & Rai, A. (Oct. 2018). Pose Aware Fine-Grained Visual Classification Using Pose Experts. In 2018 25th IEEE International Conference on Image Processing (ICIP) (pp. 2381-2385). IEEE.

McAuley, J., Targett, C., Shi, Q., & Van Den Hengel, A. (Aug. 2015). Image-based recommendations on styles and substitutes. In Proceedings of the 38th International ACM SIGIR Conference on Research and Development in Information Retrieval (pp. 43-52).

Mvasil. Code for Type Aware Fashion Compatibility. Retrieved from the internet on Apr. 21, 2020 from URL: <https://github.com/mvasil/fashion-compatibility>.

Nakamura, T., & Goto, R. (2018). Outfit generation and style extraction via bidirectional lstm and autoencoder. arXiv preprint arXiv:1807.03133.

Ramachandran, Prajit, Barret Zoph, and Quoc V. Le. "Searching for activation functions." arXiv preprint arXiv:1710.05941 (2017).

Russakovsky, Olga, et al. "Imagenet large scale visual recognition challenge." International journal of computer vision 115.3 (2015): 211-252.

Simo-Serra, E., & Ishikawa, H. (2016). Fashion style in 128 floats: Joint ranking and classification using weak data for feature extraction. In Proceedings of the IEEE Conference on Computer Vision and Pattern Recognition (pp. 298-307).

Takagi, M., Simo-Serra, E., Iizuka, S., & Ishikawa, H. (2017). What makes a style: Experimental analysis of fashion prediction. In Proceedings of the IEEE International Conference on Computer Vision Workshops (pp. 2247-2253).

Tanmay, K., & Ayush, K. (2019). Augmented Reality Based Recommendations Based on Perceptual Shape Style Compatibility with Objects in the Viewpoint and Color Compatibility with the Background. In Proceedings of the IEEE International Conference on Computer Vision Workshops (pp. 0-0).

Vasileva, M. I., Plummer, B. A., Dusad, K., Rajpal, S., Kumar, R., & Forsyth, D. (2018). Learning type-aware embeddings for fashion compatibility. In Proceedings of the European Conference on Computer Vision (ECCV) (pp. 390-405).

Veit, A., Kovacs, B., Bell, S., McAuley, J., Bala, K., & Belongie, S. (2015). Learning visual clothing style with heterogeneous dyadic co-occurrences. In Proceedings of the IEEE International Conference on Computer Vision (pp. 4642-4650).

Wang, B., Zheng, H., Liang, X., Chen, Y., Lin, L., & Yang, M. (2018). Toward characteristic-preserving image-based virtual try-on network. In Proceedings of the European Conference on Computer Vision (ECCV) (pp. 589-604).

Xthan. Code for BiDirectional LSTM for Fashion Compatibility. Retrieved from the internet on Apr. 21, 2020 from URL <https://github.com/xthan/polyvore>.

Yuan, Y., Yang, K., & Zhang, C. (2017). Hard-aware deeply cascaded embedding. In Proceedings of the IEEE international conference on computer vision (pp. 814-823).

Zoph, Barret, and Quoc V. Le. "Neural architecture search with reinforcement learning." arXiv preprint arXiv:1611.01578 (2016).

* cited by examiner

DEEP LEARNING BASED VISUAL COMPATIBILITY PREDICTION FOR BUNDLE RECOMMENDATIONS

BACKGROUND

The global fashion industry has been valued at $3 trillion, approximately 2% of the world gross domestic product. Revenue for the apparel and clothing segment alone has been estimated to rise by $257.8 billion over the next 2 years. This increase may be traceable to the development of intelligent systems in fashion commerce. For example, several recent efforts have sought to enhance features such as visually similar retrieval, fine-grained product tagging, virtual try-on, and compatible recommendations.

Generally, predicting fashion compatibility refers to determining whether a set of items go well together or complement one another. This determination can be particularly challenging due to the complex interplay among human creativity, style expertise, and self-expression involved in transforming a collection of seemingly disjoint items into a cohesive concept. One application of fashion compatibility prediction is a fill-in-the-blank (FITB) task. For example, given a set of fashion items in a bundled partial outfit with a blank to fill in, the task seeks to find the most compatible item from a set of candidate items to fill in the blank. The FITB task may be performed using compatibility prediction to evaluate compatibility between the partial outfit and each candidate item. Candidate items may be randomly chosen products, often from different categories. However, the accuracy of existing techniques for fashion compatibility prediction decreases substantially as the number of candidate items increases. In many real world applications, existing techniques for fashion compatibility perform with limited accuracy.

SUMMARY

Embodiments of the present invention are directed to using visual compatibility prediction to evaluate visual compatibility between a bundled partial outfit and each of a plurality of candidate items. Visual compatibility prediction may be jointly conditioned on item type, context, and style by determining a first compatibility score jointly conditioned on type (e.g., category) and context, determining a second compatibility score conditioned on outfit style, and combining the first and second compatibility scores into a unified visual compatibility score. The first compatibility score may be generated using a type-conditioned graph autoencoder (TC-GAE) with a graph convolutional network (GCN) that models type and context. The second compatibility score may be generated using a style autoencoder that predicts outfit style from visual features of the constituent items in the outfit. A transformation function that weights the two compatibility scores may be discovered using a search mechanism and reinforcement learning, and the learned transformation function may be applied to the two compatibility scores in operation to generate a unified visual compatibility score. A unified visual compatibility score may be determined for each candidate item, and the candidate item with the highest unified visual compatibility score may be selected to fill the in blank for the partial outfit.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
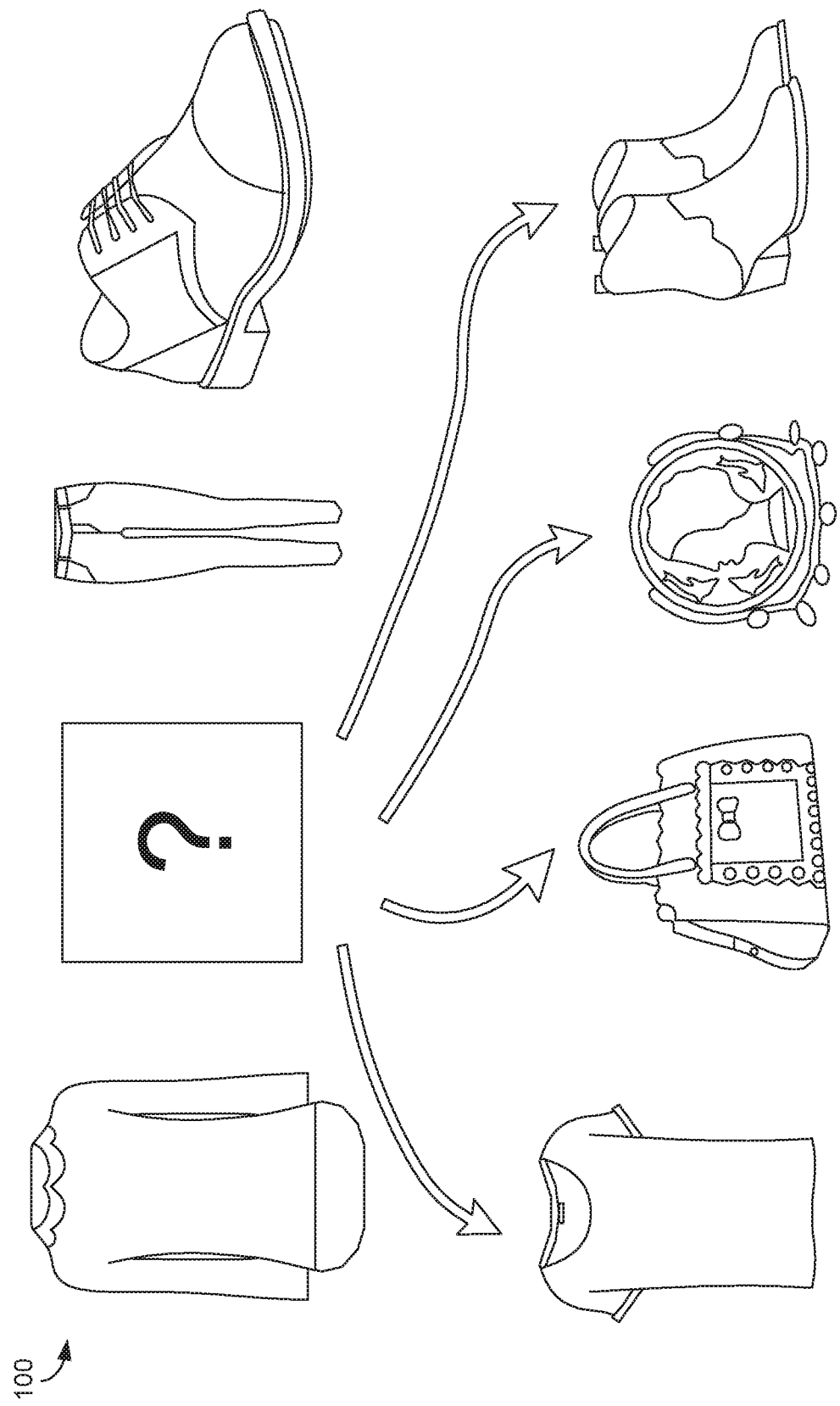
FIG. 1 is an illustration of an example fill-in-the-blank task, in accordance with embodiments of the present invention.

Generally, predicting fashion compatibility refers to determining whether a set of items go well together or complement one another. For example, a fill-in-the-blank (FITB) task may seek to evaluate a bundle of items forming a partial outfit to identify an item that best matches the partial outfit (to fill in the blank). FIG. 1 is an illustration of an example fill-in-the-blank task 100, in accordance with certain embodiments. In FIG. 1, the top row of items represents a partial outfit with three catalog items, in this case, a blouse, a pair of pants, and shoes. These three catalog items are bundled into a partial outfit along with a blank, and the task in this example is to figure out which of the candidate catalog items represented in the bottom row of FIG. 1 will best fill in the blank, that is, which candidate item is most compatible with the partial outfit. When evaluating this FITB task, existing state-of-the-art methods report performance by freezing the number of candidate choices for each FITB task to four. For example, some techniques randomly sample four candidate catalog items from all categories, or from a category that is not represented in the partial outfit. However, real-world fashion recommendation applications routinely require selection of the best item from a larger set of candidate choices, and the accuracy of existing techniques for fashion compatibility prediction decreases substantially as the number of candidate items increases. As such, there is a need for improved performance in fashion compatibility prediction.

To evaluate fashion compatibility prediction, prior techniques assess visual compatibility between a partial outfit and a candidate item in various ways. For example, some prior techniques use a convolutional neural network to extract visual features from images of each item, and then use another neural network to perform a pair-wise comparison between a candidate item and each item in the partial outfit. Some techniques seek to incorporate context from an outfit by considering an outfit to be a sequence and using a neural network with memory (e.g., long short-term memory) to generate a context-aware outfit embedding, for example, with and without a blank filled in. However, outfits are often characterized by more complex relationships that may not be fully encapsulated by representing the outfit as an ordered sequence or a combination of pairs of items.

Some more recent techniques have represented outfits as an unordered sequence, utilizing graph neural networks to encapsulate context of the outfit. For example, one prior technique represents an outfit using a category-level graph where each node represents a category and each edge represents the interaction between two types. Accordingly, each outfit is represented as a subgraph by putting items into their corresponding category nodes. Another technique uses an item-level graph to represent clothing items and their pairwise compatibility relationships. In the graph, each vertex represents a clothing item and edges connect pairs of items that are compatible. As such, a graph neural network using a binary adjacency matrix representing the graph may be used to model node interactions and learn context-aware node representations. However, these prior techniques have not performed optimally, and there is a need for improved accuracy.

In the context of fashion, an outfit may be considered to have its own style, when visualized as a whole. Effectively modeling outfit style can be a particularly valuable modality for recommendations. Preliminary attempts to incorporate style in fashion compatibility evaluations have been largely focused on extracting style representations from text captions of individual items. However, text captions are often difficult to obtain and may not accurately represent visual style, and leveraging visual cues for style may yield more robust representations. Generally, subjectivity of style and the absence of labeled data makes style extraction particularly challenging. One prior technique performs unsupervised style extraction to learn an outfit style embedding by averaging style embeddings for each item in the outfit. However, this prior technique has limited accuracy, and there is a need for improvement.

Accordingly, embodiments of the present invention are directed to visual compatibility prediction. For example, visual compatibility prediction may be used to generate recommendations to add a catalog item to a bundle of catalog items, or fill in a blank in an incomplete bundle of catalog items such as partial outfit. In some embodiments, an FITB task may be performed using visual compatibility prediction to evaluate visual compatibility between a partial outfit and each of a plurality of candidate items. Visual compatibility prediction may be jointly conditioned on item type, context, and style by determining a first compatibility score jointly conditioned on type (e.g., category) and context, determining a second compatibility score conditioned on outfit style, and combining the first and second compatibility scores into a unified visual compatibility score. The first compatibility score may be generated using a type-conditioned graph autoencoder (TC-GAE) with a graph convolutional network (GCN) that models type and context. The second compatibility score may be generated using a style autoencoder that predicts outfit style from visual features of the constituent items in the outfit. A transformation function that weights the two compatibility scores may be discovered using a search mechanism and reinforcement learning, and the learned transformation function may be applied to the two compatibility scores in operation to generate a unified visual compatibility score. A unified visual compatibility score may be determined for each candidate item, and the candidate item with the highest unified visual compatibility score may be selected to fill the in blank for the partial outfit.

In some embodiments, a type and context compatibility score may be generated as a measure of visual compatibility between a bundle of items (e.g., a partial outfit) and a candidate item by jointly considering item type (e.g., item category) and context of the bundle. For example, a catalog that includes one or more partial outfits and a plurality of candidate items may be represented as an item-level graph with catalog items represented as nodes with edges connecting pairs of nodes (catalog items) that belong to the same outfit. Visual features for each catalog item may be extracted using a convolutional neural network, and a vector of visual features for each node may be stacked into a node visual feature matrix that contains the visual features for all nodes. Furthermore, the graph may be represented by a category-co-occurrence weighted adjacency matrix that represents connected nodes with values that are weighted based on the co-occurrence of the categories of each pair of connected nodes (a pair of compatible catalog items). The node visual feature matrix and category-co-occurrence weighted adjacency matrix may be used to represent an incomplete graph and may be fed into a type-conditioned graph autoencoder (TC-GAE) with a graph convolutional network (GCN) that predicts type and context conditioned node embeddings, and decodes the node embeddings to predict missing edges in the graph. For example, the TC-GAE may predict a similarity matrix weighted with pairwise similarity values, such as probabilities that an edge (compatibility) exists between pairs of nodes (catalog items). These pairwise similarity values may be used to compute a compatibility score for a candidate item by averaging pairwise similarities between a particular item and each item from the bundle (e.g., partial outfit).

In some embodiments, a style compatibility score may be generated as a measure of visual compatibility between the style of a bundle of items (e.g., a partial outfit) and the style of a candidate item. More specifically, a measure of outfit style may be computed for a particular outfit by taking the latent node embedding for each item in the outfit from the node embeddings generated by the TC-GAE, and applying a learnable transformation to generate a corresponding item style embedding. A style embedding for the outfit may be computing by leveraging the TC-GAE decoder to attend over the items in the outfit when learning the style representation of the outfit. More specifically, the style for the outfit may be computed as a weighted combination of item style embeddings for each item in the outfit, weighted by an outfit style attention for each item. The outfit style attention for a particular item in an outfit may be generated based on pairwise similarity values (generated by the TC-GAE decoder) between the particular item and each of the other items in the outfit. The outfit style embedding may be compressed into a linear combination of elements of a style basis to form a mixture ratio embedding for the outfit (which may be reconstructed to the previous outfit style embedding for training purposes). To evaluate style compatibility, mixture ratio embeddings can be computed for a partial outfit, with and without the blank filled in, and the style compatibility score may be determined based on the change in embeddings, which can serve to minimize the change in style when filling the blank. For example, the style compatibility score for each candidate item may be defined as the inverse of the decrease in uncertainty (e.g., cross-entropy) of the outfit mixture ratio on adding the candidate item to the bundle.

In embodiments that compute both a type/context compatibility score and a style compatibility score, the compatibility scores may be combined and/or weighted in any suitable manner. In a simple example, the compatibility scores may be averaged or combined in a linear combination. In some embodiments, a transformation function that weights the two compatibility scores may be discovered using a search mechanism and reinforcement learning. For example, a composite function may be constructed with operands, unary functions, and/or binary functions predicted from a search space using a neural network (e.g., a recurrent neural network) controller (e.g., by selecting the functions predicted by respective multi-class classifiers with the highest probabilities). During training, compatibility scores may be fed into a predicted candidate function to compute a unified compatibility score, and the controller may be updated using accuracy of the unified compatibility score as a reward signal. In operation, a learned transformation function may be applied to the two compatibility scores to generate a unified visual compatibility score between a candidate item and a partial outfit. The process may be repeated for any number of candidate items, and the candidate item with the highest compatibility score may be selected to fill in the blank.

As such, using implementations described herein, visual compatibility predictions that are jointly conditioned on item type, context, and style may be generated. Visual compatibility prediction may leverage a type-conditioned graph auto-encoder with a weighted adjacency matrix to generate a type and context compatibility score, a style autoencoder, attending over outfit items, to generate a style compatibility score, and/or a learned transformation function to generate a unified compatibility score between a candidate item and a bundle (e.g., a partial outfit). The visual compatibility prediction techniques described herein may be used in various applications such as visually similar retrieval, fine-grained product tagging, virtual try-on, and compatible recommendations. In an example application in fashion commerce, visual compatibility prediction techniques described herein may be used to predict a catalog item that best completes a partial outfit. Using techniques described herein, recommendations to complete partial bundles may be predicted from a larger set of candidate items with increased accuracy when compared with prior techniques.

Having briefly described an overview of aspects of the present invention, various terms used throughout this description are provided. Although more details regarding various terms are provided throughout this description, general descriptions of some terms are included below to provider a clearer understanding of the ideas disclosed herein:

As used herein, a neural network generally refers to a machine-learning model that learns to approximate unknown functions by analyzing example (e.g., training) data at different levels of abstraction. Generally, neural networks can model complex non-linear relationships by generating hidden vector outputs along a sequence of inputs. In particular, a neural network can include a model of interconnected digital neurons that communicate and learn to approximate complex functions and generate outputs based on a plurality of inputs provided to the model. A neural network can include a variety of deep learning models, including convolutional neural networks, recurrent neural networks, deep neural networks, and deep stacking networks, to name a few examples. A neural network may include or otherwise make use of one or more machine learning algorithms to learn from training data. In other words, a neural network can include an algorithm that implements deep learning techniques such as machine learning to attempt to model high-level abstractions in data.

In the context of graph theory, as used herein, a graph is a data structure that represents objects as nodes (also called vertices) and relationships between nodes as edges connecting the nodes. A graph neural network (GNN) is a neural network that operates on a graph and models relationships among nodes in a graph and/or other graph structures.

Example Visual Compatibility Prediction Environment

Figure 2:
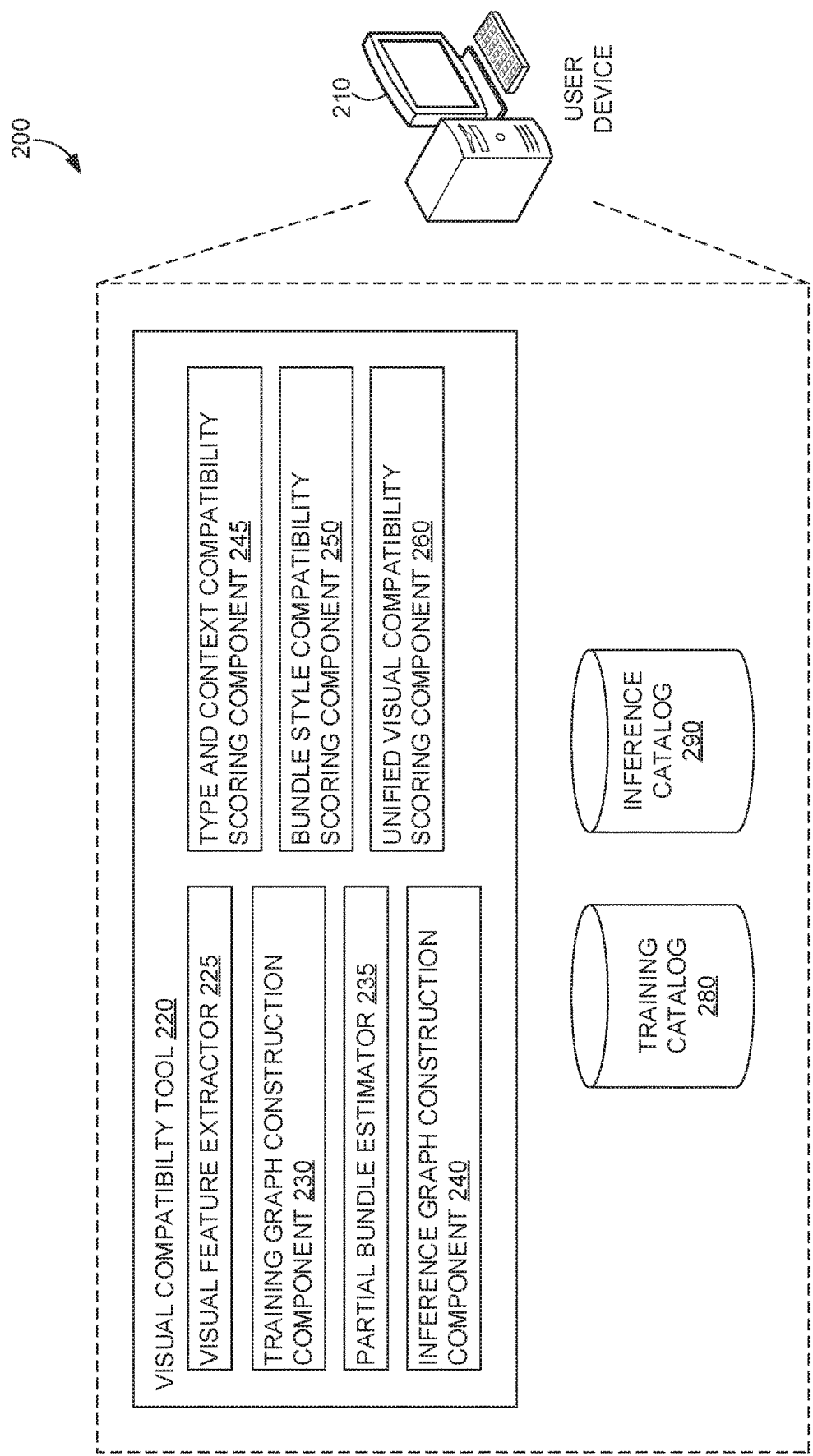
FIG. 2 is a block diagram of an example computing system for visual compatibility prediction, in accordance with embodiments of the present invention.

Referring now to FIG. 2, a block diagram of example environment 200 suitable for use in implementing embodiments of the invention is shown. Generally, environment 200 is suitable for visual compatibility prediction, and, among other things, facilitates generation of recommendations to fill in the blank in a bundle of catalog items such as partial outfit. Environment 200 includes a user device 210, which may be any kind of computing device capable of facilitating visual compatibility prediction. For example, in an embodiment, user device 210 may be a computing device such as computing device 700, as described below with reference to FIG. 7. In embodiments, user device 210 can be a personal computer (PC), a laptop computer, a workstation, a mobile computing device, a PDA, a cell phone, or the like. User device 210 may be in communication with one or more computing devices such as a server (not shown in FIG. 2) through a network, which may include, without limitation, one or more local area networks (LANs) and/or wide area networks (WANs). Such networking environments are commonplace in offices, enterprise-wide computer networks, intranets, and the Internet.

As illustrated in FIG. 2, user device 210 includes a visual compatibility tool 220. Generally, visual compatibility tool 220 may generate bundle recommendations and/or visual compatibility scores between candidate items and a bundle (e.g., a partial outfit). Visual compatibility tool 220, or some portion thereof, may be incorporated, or integrated, into an application or an add-on or plug-in to an application. The application may generally be any application capable of facilitating visual compatibility prediction, and may be a stand-alone application, a mobile application, a web application, or the like. In some implementations, the application comprises a web application, which may run in a web browser, and may be hosted at least partially server-side. In addition, or instead, the application may comprise a dedicated application. In some cases, the application may be integrated into the operating system (e.g., as a service). Additionally or alternatively, visual compatibility tool 220, or some portion thereof, may be integrated into an operating system (e.g., as a service), a server (e.g., a remote server), and/or some other device or component.

In the embodiment illustrated in FIG. 2, user device 210 includes training catalog 280 and inference catalog 290. Generally, a catalog may store any collection of items, which may be represented in any suitable manner. For example, a catalog may comprise a collection of goods, services, activities, resources, or other representable item or unit. An example catalog in fashion commerce may include a collection of clothing and accessories sold by a particular manufacturer, distributor, or retailer. In some embodiments, the catalog may classify the catalog items into any number of categories. To continue with the example of a fashion catalog, categories may include shoes, shirts, pants, shorts, hats, etc. Generally, catalog items may be represented in any suitable manner. For example, a catalog may comprise images of catalog items, metadata describing features of catalog items (e.g., category data, visual features, etc.), and/or other elements. In some embodiments, catalog items in training catalog 280 and/or inference catalog 290 may be featurized for use by one or more neural networks. For example, images of the catalog items may be evaluated (e.g., by visual feature extractor 225, which may include a convolutional neural network) to extract a desired set of visual features and/or encode each catalog item into a corresponding feature vector, and feature vectors for the catalog items may be stored for use by one or more neural networks. Although training catalog 280 and inference catalog 290 and are illustrated as being stored on user device 210, this need not be the case, as training catalog 280 and/or inference catalog 290 may be stored at, and/or accessed, from some other location.

Generally, visual compatibility tool 220 may include one or more neural networks that may be trained using training data from training catalog 280. In operation, the one or more trained neural networks may evaluate data from inference catalog 290 to generate bundle recommendations and/or visual compatibility scores between candidate items and a bundle (e.g., a partial outfit). In the embodiment illustrated in FIG. 2, visual compatibility tool 220 includes visual feature extractor 225, training graph construction component 230, partial bundle estimator 235, inference graph construction component 240, type and context compatibility scoring component 245, bundle style compatibility scoring component 250, and unified visual compatibility scoring component 260. This configuration is meant merely as an example, and any or all of these components may reside on one or more other devices.

At a high level, type and context compatibility scoring component 245 may generate a type and context compatibility score jointly conditioned on type (e.g., category) and context. More specifically, type and context compatibility scoring component 245 may generate a measure of visual compatibility between a bundle of catalog items (e.g., a partial outfit) and a candidate catalog item by jointly considering item type (e.g., item category) and context of the bundle. To accomplish this, type and context compatibility scoring component 245 may include one or more neural networks configured to predict similarity between pairs of catalog items by modeling a catalog comprising a partial bundle and candidate items as an incomplete graph and predicting missing edges in the graph. More specifically, the one or more neural networks may predict probabilities of edges (compatibility) between pairs of catalog items, and the probabilities may be used to compute the type and context compatibility score.

To train the one or more neural networks of type and context compatibility scoring component 245, training graph construction component 230 may use training data from training catalog 280 to construct an incomplete graph representing one or more incomplete bundles of items from training catalog 280, and the one or more neural networks may be trained to predict missing edges in the incomplete graph to complete the bundles. For example, training catalog 280 may include a number of example bundles, and training may involve randomly removing and adding catalog items to and from bundles (e.g., randomly removing a subset of edges and randomly sampling a set of negative edges), for example, at a particular training interval (e.g., every N epochs, every random number of epochs), and ground truth data from training catalog 280 may be used to update the one or more neural networks to predict the known bundles (e.g., missing and incorrect edges).

In operation, inference graph construction component 240 may construct an incomplete graph representing one or more partial bundles of items from inference catalog 290, and the one or more neural networks of type and context compatibility scoring component 245 may predict missing edges in the incomplete graph to complete the bundles and generate a compatibility score(s) based on the predicted edges. Initially, one or more partial bundles (e.g., a set of items in inference catalog 290 forming a partial outfit with an identified blank to be filled in) may be obtained or identified in various ways. In some embodiments, visual compatibility tool 220 may provide a user interface that accepts an input identifying an inference catalog (or portion thereof), one or more partial bundles of items from the identified inference catalog, and/or a set of eligible candidate items from the identified inference catalog to consider for completion of the partial bundle(s). In another example, partial bundle estimator 235 may determine an initial estimate of partial bundles (e.g., an initial estimate of item compatibility among items in inference catalog 290, or a subset thereof) based on purchase history associated with catalog items and/or partial bundling rules (e.g., items that were purchased in the same order a threshold number of times, sufficiently sized clusters of a commonly purchased items, etc.). In yet another example, in some embodiments, partial bundles may be identified in inference catalog 290 itself. Generally, each catalog item may be included in any number of bundles (i.e., zero, one, or more). Inference graph construction component 240 may construct an item-level graph with a node for each catalog item to be evaluated, and with bundled items in the identified partial bundles connected by edges. This graph may be considered incomplete, and the one or more neural networks of type and context compatibility scoring component 245 may predict probabilities that edges exist between the nodes in a corresponding completed graph. The predicted probabilities may be used to generate a type and context compatibility score between each candidate item and a partial bundle of items, as explained in more detail below.

Continuing with a high level overview, bundle style compatibility scoring component 250 may generate a style compatibility score conditioned on bundle style (e.g., outfit style). For example, bundle style compatibility scoring component 250 may generate a measure of visual compatibility between the style of a bundle of items (e.g., a partial outfit) and the style of a candidate item. To accomplish this, bundle style compatibility scoring component 250 may leverage features from the one or more neural networks of type and context compatibility scoring component 245, such as encoded latent node embeddings, learned decoder weights, and/or predicted edge probabilities (i.e., node similarities). Accordingly, the one or more neural networks of bundle style compatibility scoring component 250 may be trained using the same training catalog 280, and/or operated using the same inference catalog 290, as the one or more neural networks of type and context compatibility scoring component 245.

Generally, the one or more neural networks of bundle style compatibility scoring component 250 may be trained to evaluate visual style of a bundle of catalog items and predict a measure of the style of the bundle (e.g., outfit style). For example, training catalog 280 may include a number of example bundles, and unsupervised learning may be applied to train the one or more neural networks to predict a measure of the visual style of a bundle. In operation, bundle style compatibility scoring component 250 may use the one or more neural networks to predict a measure of the visual style of a partial bundle and each candidate completed bundle (i.e., a partial bundle filled in with a candidate item). Bundle style compatibility scoring component 250 may generate a style compatibility score based on the change in the measure of the visual style of the bundle when adding the candidate item to the bundle. For example, the style compatibility score for a particular candidate item may be defined as the inverse of the decrease in uncertainty (e.g., cross-entropy) of the measure of the visual style of the bundle upon adding the candidate item to the bundle.

Generally, type and context compatibility scoring component 245 may generate a type and context compatibility score quantifying compatibility between a particular candidate item and a partial bundle, for each of a plurality of candidate items. Similarly, bundle style compatibility scoring component 250 may generate a style compatibility score quantifying compatibility between a particular candidate item and a partial bundle, for each of a plurality of candidate items. In some embodiments, either the type and context compatibility scores, or the style compatibility scores, alone may be used to generate bundle or compatibility recommendations (e.g., by presenting or automatically bundling a number of candidate items with the top score or scores).

In other embodiments, unified visual compatibility scoring component 260 may combine and/or weight the two modalities of compatibility scores in any suitable manner to generate a unified compatibility score between a particular candidate item and a partial bundle, for each of a plurality of candidate items. In a simple example, unified visual compatibility scoring component 260 may average or combine the compatibility scores in a linear combination. In some embodiments, unified visual compatibility scoring component 260 may weight the two compatibility scores using a transformation function discovered using a search mechanism and reinforcement learning, as explained in more detail below. Thus, unified visual compatibility scoring component 260 may generate a unified compatibility score quantifying compatibility between a particular candidate item and a partial bundle, for each of a plurality of candidate items, and the unified compatibility scores may be used to generate bundle or compatibility recommendations (e.g., by presenting or automatically bundling a number of candidate items with the top score or scores). Compatibility recommendation(s), bundle recommendation(s), and/or other predicted features may be presented and/or stored for future use.

Figure 3:
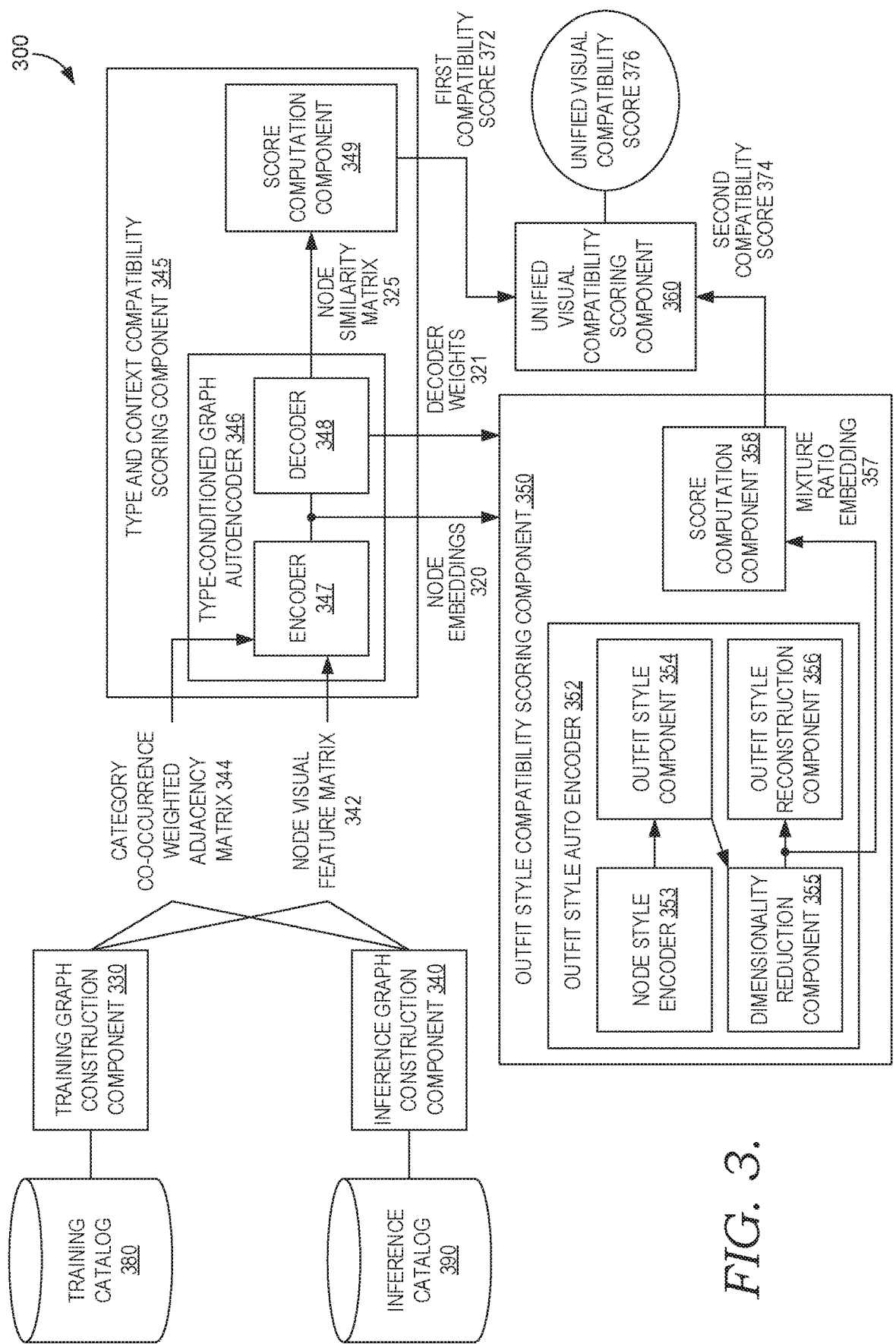
FIG. 3 is a block diagram of an example visual compatibility tool, in accordance with embodiments of the present invention.

Turning now to FIG. 3, FIG. 3 is a block diagram of an example visual compatibility tool 300, in accordance with embodiments of the present invention. For example, in some embodiments involving bundled partial outfits of fashion items such as clothing and apparel, visual compatibility tool 300 may correspond with visual compatibility tool 220 of FIG. 2 (and the components of visual compatibility tool 300 may correspond with the components of visual compatibility tool 220 of FIG. 2).

Generally, whether for training or inference, a particular catalog (or portion thereof), partial outfit(s), and/or eligible candidate items may be identified (e.g., by training graph construction component 330, inference graph construction component 340, one or more user inputs, and/or otherwise) based on the particular training or inference task under consideration, as described in more detail above. As such, training graph construction component 330 or inference graph construction component 340 may generate, from an identified catalog (e.g., training catalog 380, inference catalog 390, or portion thereof): (1) an incomplete graph representing the identified partial outfit(s) and candidate items from the catalog, (2) a node visual feature matrix or some other representation of the identified catalog items under consideration, and/or (3) a category-co-occurrence weighted adjacency matrix for the incomplete graph.

Taking each in turn, an item-level graph may be generated with catalog items under consideration represented as nodes with edges connecting pairs of nodes (catalog items) that belong to the same partial outfit. If the task is to evaluate an entire catalog (or a designated subset thereof) for the most compatible item to complete a partial outfit, each item in catalog (or designated subset) may be represented with a node. For example, Let G=(V,E) be an undirected graph with N nodes where each edge(i,j)∈E connects a pair of nodes i, j∈V. The nodes in the graph may be represented in any suitable manner. In one embodiment, node visual feature matrix 342 may be formed by stacking visual features for each node in the graph. For example, each catalog item under consideration may be represented as a feature vector (e.g., for example, by extracting visual features from an image of each catalog item using visual feature extractor 225 of FIG. 2), and the feature vectors for the nodes of the catalog items under consideration may be stacked into a matrix. More specifically, each node in the graph may be represented with a vector of features, $\vec{x_i} \in R^F$, and a node visual feature matrix 342 may be formed as $X = \{\vec{x_0}, \vec{x_1}, \ldots, \vec{x_{N-1}}\}$, where $X \in R^{N \times F}$ and includes visual features for all nodes.

In some embodiments, category-co-occurrence weighted adjacency matrix 344 may be generated from the item-level graph G. Generally, each node in the graph corresponds to a catalog item that may include category information classifying the catalog item into a particular category. Example categories for a fashion catalog may include shoes, shirts, pants, shorts, hats, and/or others. The catalog may include category information for C categories, and a C×C co-occurrence matrix (or some other data structure) may be generated to represent the co-occurrence of the categories in the catalog. For each pair of categories $c_i$ and $c_j$, a corresponding position in the co-occurrence matrix (i,j) may be populated with a value such as the count or percentage of how many catalog items in the catalog under consideration are part of both categories $c_i$ and $c_j$. Using this category co-occurrence information, an adjacency matrix for the graph G may be weighted. More specifically, values in the adjacency matrix representing graph edges may be obtained by looking up the value from the co-occurrence matrix corresponding to the categories of the nodes connected by a particular edge. That is, for each edge in the adjacency matrix, the two nodes connected by the edge may be identified, the categories for the two nodes may be identified (e.g., from catalog metadata), and the pair of categories $c_i$ and $c_j$ may be used to lookup a corresponding value (e.g., count) from the co-occurrence matrix. Thus, G may be represented by a weighted adjacency matrix $A \in R^{N \times N}$ matrix, where $A_{i,j}=Count_{ci,cj}$ if an edge exists between nodes i and j, and $A_{i,j}=0$ otherwise.

Type and context compatibility scoring component 345 may include a type conditioned graph autoencoder (TC-GAE) 346. TC-GAE 346 may include encoder 347 that encodes node visual feature matrix 342 into type and context conditioned node embeddings 320 using category-co-occurrence weighted adjacency matrix 344. Further. TC-GAE 346 may include decoder 348 that decodes node embeddings 320 into probabilities of missing edges in the graph (e.g., node similarity matrix 325).

Encoder 347 may transform node visual feature matrix 342 into a corresponding latent representation (e.g., node embeddings 320), which may be represented in any suitable form (such as a matrix with the same dimensionality as node visual feature matrix 342). Thus, for each given node i in graph G, encoder 347 may transform the node's feature vector $\vec{x}_i$ into a latent representation $\vec{h}_i$ (e.g., a corresponding row of a matrix of node embeddings 320). Encoder 347 may be implemented as a graph convolutional network with multiple hidden layers. In order for node embeddings 320 to encode information not only about itself, but also about its context in a bundle or outfit, category-co-occurrence weighted adjacency matrix 344 can be used instead of the binary adjacency matrix. The context for each node may be defined by its neighbors $\vec{N}_i = \{j \in V | A_{i,j} \neq 0\}$, and at each layer l+1, the hidden state $H^{l+1}$ may be represented as:

$$H^{(l+1)} = ReLU\left(\sum_{s=0}^{S} \tilde{A}_s H^{(l)} \Theta_s^{(l)}\right)$$

where $\tilde{A}_s$ is a normalized $s^{th}$ step (category-co-occurrence weighted) adjacency matrix, S is the context depth (e.g., 1 to consider only immediate neighbors), and $\Theta^{(l)}$ contains the trainable parameter for layer l.

Decoder 348 may be implemented with a neural network that predicts the probability of two nodes in the graph being connected. More specifically, decoder 348 may transform node embeddings 320 into probabilities of missing edges in the graph, which may be represented in any suitable form. For example, decoder 348 may predict a node similarity matrix$\in R^{N \times N}$ (e.g., node similarity matrix 325), with each value (i,j) quantifying a probability that an edge exists between notes i and j. Decoder 348 may be implemented to be type-respecting when comparing two nodes i, j with latent representations $\vec{h}_i, \vec{h}_j$ and categories $c_i, c_j$ respectively, for example, by defining the edge probability p predicted by decoder 348 to be:

$$p = \sigma(|\vec{h}_i - \vec{h}_j| \vec{\omega}_{c_i,c_j}^T + b_{c_i,c_j})$$

where $\vec{\omega}_{c_i,c_j} \in R^{F'}$ and $b_{c_i,c_j} \in R$ are learnable parameters, F' is the dimension of the hidden state embedding, and $\sigma(\cdot)$ is the sigmoid function that maps a scalar value to a valid probability$\in(0, 1)$.

Generally, TC-GAE 346 may generate probabilities that edges exist in an encoded input graph. For example, TC-GAE 346 may generate a probability that an edge between of pair of nodes in the graph exists. The predicted probabilities may be seen as a measure of pairwise similarity between items (pairs of nodes corresponding to a predicted edge probability), and may be predicted in any suitable form (e.g., node similarity matrix 325). Score computation component 349 may use the predicted pairwise similarities to generate a type and context conditioned compatibility score comparing a candidate item to a partial outfit, as explained in more detail below.

In terms of training, training catalog 280 may include a number of example bundles, and training may involve randomly removing and adding catalog items to and from bundles (e.g., randomly removing a subset of edges and randomly sampling a set of negative edges), for example, at a particular training interval (e.g., every N epochs, every random number of epochs), and ground truth data from training catalog 280 may be used to update TC-GAE 346. For example, every $N_{random}$ epochs, a subset of known edges $E^+$ may be randomly removed, a subset of negative edges $E^-$ may be randomly added, and an incomplete graph may be constructed from the training catalog using the modified edges. In this example, the set of removed edges is denoted by $E^+$, as it represents positive edges, i.e., pairs of nodes (i,j) that should be connected, such that $A_{i,j} \neq 0$, but the edges have been removed by setting $A_{i,j}=0$. Further, the randomly sampled subset of negative edges is denoted $E^-$, as it represents negative edges, i.e., pairs of nodes (i,j) that should not be the edges have been added by setting $A_{i,j}=Count_{c_i,c_j}$, for example. TC-GAE 346 may predict pairwise node similarities based on the incomplete graph, including probabilities for the set of edges $E_{train}=(E^+, E^-)$. TC-GAE 346 may be optimized by minimizing loss (e.g. cross entropy loss) between predictions of edge probabilities for the edges in $E_{train}$ and ground truth values (e.g., 1 for the edges in $E^+$ and 0 for the edges in $E^-$).

Outfit style compatibility scoring component 350 may include an outfit style autoencoder 352 configured to generate a measure of visual compatibility between the style of a particular outfit (e.g., a partial outfit, each candidate completed outfit, etc.). To accomplish this, outfit style autoencoder 352 may leverage node embeddings 320 generated by TC-GAE 346, learned decoder weights of decoder 348, and/or pairwise similarities (i.e., edge probabilities from node similarity matrix 325) predicted by TC-GAE 346. In the embodiment illustrated in FIG. 3, outfit style autoencoder 352 includes node style encoder 353, outfit style component 354, dimensionality reduction component 355, outfit style reconstruction component 356, and score computation component 358. Generally, node style encoder 353 may apply a first learned transformation to latent node embeddings (e.g., from node embeddings 320) to generate item style embeddings for each item in a particular outfit. Outfit style component 354 may compute a style embedding for the outfit by attending over the item style embeddings for the items in the outfit, for example, by computing a weighted combination of the item style embeddings, weighted by an outfit style attention for each item, which may be based on predicted pairwise node similarities. Dimensionality reduction component 355 may compress the outfit style embedding into a linear combination of elements of a style basis to form a mixture ratio embedding 357 for the outfit using a second learned transformation. Outfit style reconstruction component 356 may reconstruct the outfit style embedding from the mixture ratio embedding 357 using a third learned transformation. Generally, outfit style autoencoder 352 may be trained to learn the three transformations using unsupervised learning, as explained in more detail below.

More specifically, consider an outfit O with $N_o$ items. First, for each item $i \in O$, node style encoder 353 may transform the latent node embedding $\vec{h}_i$ for the item (e.g., from node embeddings 320) into an item style embedding $y_i$, such that $y_i = W_s \cdot \vec{h}_i$, where $W_s$ is a learnable style transformation matrix. Next, outfit style component 354 may compute an outfit style attention $\alpha_i$ for each item in the outfit, as $$\alpha_i \frac{e^{d_i}}{\sum_{j \in O} e^{d_j}}$$

where

-continued $$d_i = \frac{1}{N_o - 1} \sum \sigma(|\vec{h}_i - \vec{h}_j|\vec{\omega}_{c_i,c_j}^T + b_{c_i,c_j}).$$

Note that the term inside the summation may be the edge probability p predicted by decoder 348. As such, outfit style component 354 may compute outfit style attention $\alpha_i$ using latent representations $\vec{h}_i$, $\vec{h}_j$ (e.g., from node embeddings 320) and decoder weights $\vec{\omega}_{c_i,c_j}$ and $b_{c_i,c_j}$ from decoder 348, and/or may access edge probability p from node similarity matrix 325. Thus, in some embodiments, outfit style component 354 may determine an outfit style attention $\alpha_i$ for each item an in outfit O by averaging pairwise node similarities between node i and each of the other nodes in the outfit O. As such, outfit style component 354 may generate an outfit style embedding $z^O$ for an outfit O as:

$$z^O = \sum_{i=1}^{N_o} \alpha_i y_i$$

where $y_i$ is the item style embedding and $\alpha_i$ is outfit attention for item i.

Generally, dimensionality reduction component 355 may compress the outfit style embedding into a linear combination of elements of a style basis to form a mixture ratio embedding 357. Generally, the outfit style embedding may comprise any number of dimensions (e.g., 100). Some number of styles may be assumed to exist (e.g., casual and formal, in a simple example) in a particular style basis. A style basis is a vector space in which each dimension or element corresponds to a different style. Assuming such a basis exists, an outfit may be represented as a linear combination of elements of the basis. For example, given a style basis that has two elements, casual and formal, outfits can be labeled as casual, formal, or their mixture. This mixture can be represented as a linear combination of the elements of the style basis, forming a particular mixture ratio in the style basis, These are meant simply as examples, and an outfit style embedding with any number of dimensions may be transformed into a linear combination of any number of elements (e.g., mixture ratio embedding 357), whether or not dimensionality is reduced. More specifically, mixture ratio embedding 357 for an outfit O may be denoted $p^O \in R^\kappa$ as $p^O$=softmax $(W_z \cdot z^O + b_z)$, where $W_z$ and $b_z$ are a weight matrix and bias vector of a learnable transformation from outfit style embedding to a mixture ratio embedding, and $\kappa$ represents the number of elements of the style basis. Here, since p is assumed to be a mixture ratio, the softmax function may be applied so that each element of p is non-negative and the sum of its elements is 1.

Outfit style reconstruction component 356 may reconstruct the outfit style embedding $z^O$ from mixture ratio embedding 357. For example, outfit style reconstruction component 356 may generate a reconstructed outfit style embedding $r^O$ as $r^O = W_p^t \cdot p^O$, where $W_p$ is a learnable transformation from mixture ratio embedding to reconstructed outfit style embedding.

Generally, the training objective for outfit style autoencoder 352 may be to minimize some measure of loss $L_{train}$, which may be formulated as a combination of a reconstruction triplet loss and an orthoganalization loss, such as:

$$L_R(r^O, z^O, z') = \max(0, m_r - d(r^O, z^O) + d(r^O, z'))$$

$$L_O(W_p) = \|W_{pn} W_{pn}^T - I\|$$

$$L_{train} = L_R + L_O$$

where d(r,z) may be the cosine similarity between vector representations r and z, $W_{pn}$ is normalized $W_p$, and I is the identity matrix. Here, z' is an outfit style embedding for an outfit different than outfit O. Accordingly, outfit style autoencoder 352 may be trained using unsupervised learning by reconstructing the outfit style embedding.

Returning now to a visual compatibility task such as predicting the best candidate item to complete a partial outfit, generally, visual compatibility tool 300 may use TC-GAE 346 to and/or outfit style autoencoder 352 to generate different modalities of compatibility scores. For example, TC-GAE 346 may generate a measure of pairwise similarity between items (e.g., node similarity matrix 325), which may be used to generate any number of compatibility scores relevant to the task. For example, score computation component 349 may use the predicted pairwise similarities to generate a type and context conditioned compatibility score comparing a candidate item to a partial outfit. More specifically, score computation component 349 may average pairwise similarities between a particular candidate item and each item from an identified partial outfit. In some embodiments, score computation component 349 may generate a type and context conditioned compatibility score quantifying compatibility between a particular candidate item and a partial outfit, for each of a plurality of candidate items. In some embodiments, the type and context conditioned compatibility scores may be used by themselves to generate bundle or compatibility recommendations (e.g., by presenting or automatically bundling a number of candidate items with the top score or scores). When the task is an FITB task, the candidate item with the highest score may be presented as a bundle recommendation, automatically bundled with the partial outfit to complete the outfit, and/or the like Additionally or alternatively, outfit style autoencoder 352 may use node embeddings 320, decoder weights 321 of decoder 348, and/or pairwise similarities (e.g., from node similarity matrix 325) predicted by TC-GAE 346 to generate any number outfit style compatibility scores relevant to the task. For example, outfit style autoencoder 352 may a generate mixture ratio embedding 357 quantifying the style of a partial outfit, with and without a blank filled in, and score computation component 358 may generate a style compatibility score based on the change in mixture ratio embedding 357. For example, the style compatibility score for each candidate item may be defined as the inverse of the decrease in uncertainty (e.g., cross-entropy) of the outfit mixture ratio (mixture ratio embedding 357) on adding a particular candidate item to the partial outfit. This may effectively serve to minimize the change in style when filling a blank (e.g., adding an item to a partial outfit). In some embodiments, score computation component 358 may generate a style compatibility score quantifying compatibility between a particular candidate item and a partial outfit, for each of a plurality of candidate items. In some embodiments, the style compatibility scores may be used by themselves to generate bundle or compatibility recommendations (e.g., by presenting or automatically bundling a number of candidate items with the top score or scores). When the task is an FITB task, the candidate item with the highest score may be presented as a bundle recommendation, automatically bundled with the partial outfit to complete the outfit, and/or the like.

In some embodiments, unified visual compatibility scoring component 360 may combine and/or weight the two modalities of compatibility scores in any suitable manner to generate a unified compatibility score 376 between a particular candidate item and a partial outfit. In a simple example, unified visual compatibility scoring component 360 may average or combine the compatibility scores (e.g., first compatibility score 372 and second compatibility score 374) in a linear combination. In another example, unified visual compatibility scoring component 360 may weight the compatibility scores using a transformation function discovered using a search mechanism and reinforcement learning.

Figure 4:
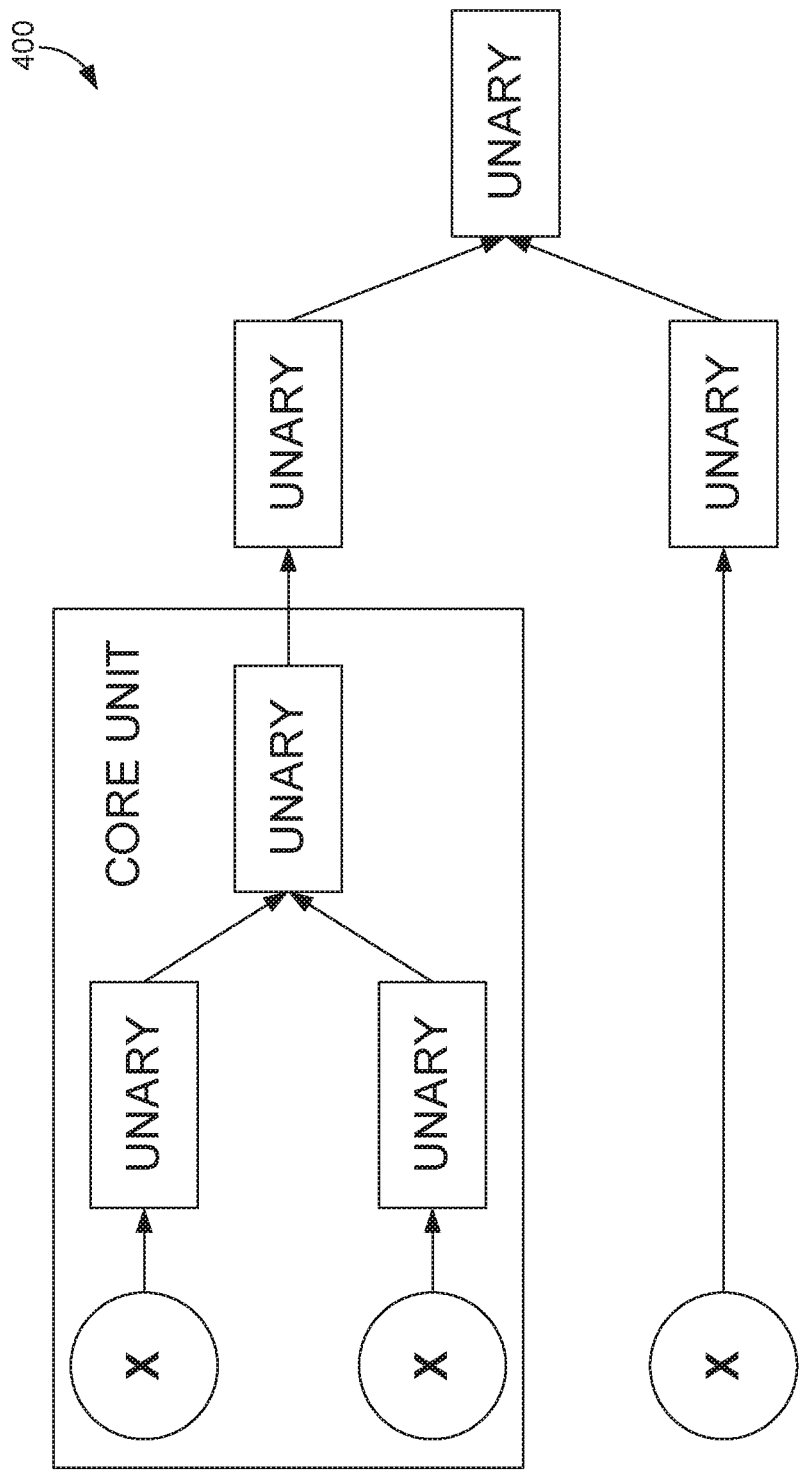
FIG. 4 is a block diagram of an example composite function structure, in accordance with embodiments of the present invention.

More specifically, a composite function may be defined and constructed with operands, unary functions, and/or binary functions predicted from a search space using a neural network controller, such as a recurrent neural network (RNN) controller. FIG. 4 illustrates an example composite function structure 400. Generally, a composite function may use a structure (e.g., composite function structure 400) that is composed with multiple repetitions of a core unit. In the example illustrated in FIG. 4, the core unit comprises two inputs (operands), two unary functions, and one binary function. Generally, the operands may be scaler values. The unary functions may take in a single scalar input and return a single scalar output. Binary functions may take in two scalar inputs and return a single scalar output.

Generally, the composite function may be constructed by repeatedly composing the core unit by predicting the components of the core unit (e.g., operands, unary functions, and/or binary function) from a search space. An example search space for operands may include a compatibility score x generated using TC-GAE 346, a compatibility score y generated using outfit style autoencoder 352, x+y, and/or the like. An example search space for unary functions may include x, −x, $x^2$, |x|, $x^3$, $\sqrt{|x|}$, $e^x$, sin x, cos x, sinh x, cosh x, tanh x, erfx, tan−1 x, σ(x), max (x, 0), min (x, 0), $\log_e (1+e^x)$, and/or the like. An example search space for binary functions may include $x_1+x_2$, $x_1-x_2$, $x_1*x_2$, $\max(x_1, x_2)$, $\min(x_1, x_2)$, $\sigma(x_1)*x_2$, and/or the like.

A search algorithm that uses one or more neural networks may be used to compose the composite function by predicting the components of the function from a designated search space (e.g., operands, unary functions, binary function). For example, each component of the core unit may have an associated multiclass classifier with a number of classes corresponding to the number of candidate functions in the search space. For example, if there are 15 candidate unary functions, a 15-class classifier may be used to predict one of the 15 unary functions (e.g., by selecting function with the highest predicted probability). In some embodiments, recurrent neural network (RNN) controller may be used to predict the components of the core unit and/or composite function. For example, an RNN controller may include a memory cell for each component to be predicted (e.g., in the core unit), and each cell may predict a single component during a single time step. At each time step, the RNN controller may predict a single component of the core unit, and the prediction made during one time step may be fed back to the RNN controller and used as the input for the next prediction in the next time step. The RNN controller may be initialized to any initial state (e.g., all zeros, random∈(0, 1), etc.), and may compose the core unit by first predicting two operands (op1 and op2), then two unary functions (u1 and u2) to apply on the operands, and then a binary function b that combines the outputs of the two unary functions. The resulting b(u1(op1); u2(op2)) may then become an operand that may be selected in a subsequent group of predictions for a subsequent composition of the core unit. The process may be repeated to compose the core unit any number of times in constructing a composite candidate function.

Once a candidate function has been generated by the search algorithm, the candidate function may be applied to combine the two modalities of compatibility scores between a particular candidate item and a partial outfit. For training, known outfits in a training catalog (e.g., training catalog 380) may be used to sample partial outfits and candidate items known to be compatible and incompatible. The partial outfits and candidate items may be used to generate first and second compatibility scores 372 and 374 (by type and context compatibility score component 345 and outfit style compatibility scoring component 350, respectively), and the candidate function may be used to combine the first and second compatibility scores 372 and 374 to generate a unified visual compatibility score 376. Reinforcement learning may be used to train the RNN controller, for example, by using the accuracy of the predicted unified visual compatibility score as a reward signal. This process may be repeated over any number of outfits and/or candidate items from the training data, and/or for any number of epochs. By way of nonlimiting example, when training on the Maryland Polyvore dataset, an example learned transformation may be of the form: unified score=$e^y$−relu($e^{(-|y-sin(x)|)}$), where, x is type and context conditioned compatibility score, and y is the style compatibility score. As such, a transformation function may be discovered using reinforcement learning.

In operation, unified visual compatibility scoring component 360 may apply the learned transformation function to the two compatibility scores 372 and 374 to generate a unified visual compatibility score 376 between a candidate item and a partial outfit. Thus, unified visual compatibility scoring component 360 may generate a unified compatibility score 376 quantifying compatibility between a particular candidate item and a partial bundle, for each of a plurality of candidate items, and unified compatibility scores 376 may be used to generate bundle or compatibility recommendations (e.g., by presenting or automatically bundling a number of candidate items with the top score or scores). When the task is an FITB task, the candidate item with the highest score may be presented as a bundle recommendation, automatically bundled with the partial outfit to complete the outfit, and/or the like. In any event, compatibility recommendation(s), bundle recommendation(s), and/or other predicted features may be presented and/or stored for future use.

Example Flow Diagrams

Figure 5:
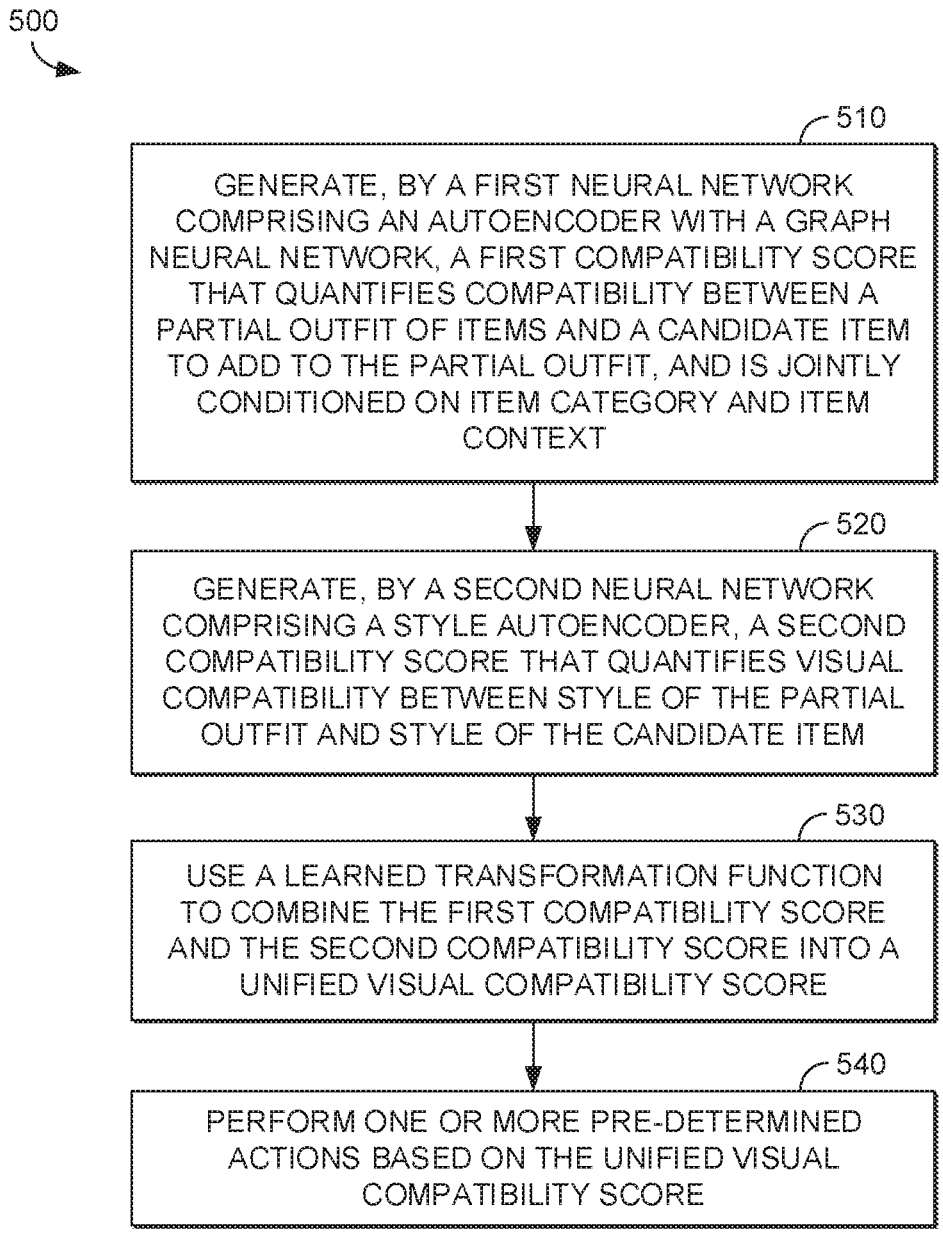
FIG. 5 is a flow diagram showing a method for visual compatibility prediction, in accordance with embodiments of the present invention.
Figure 6:
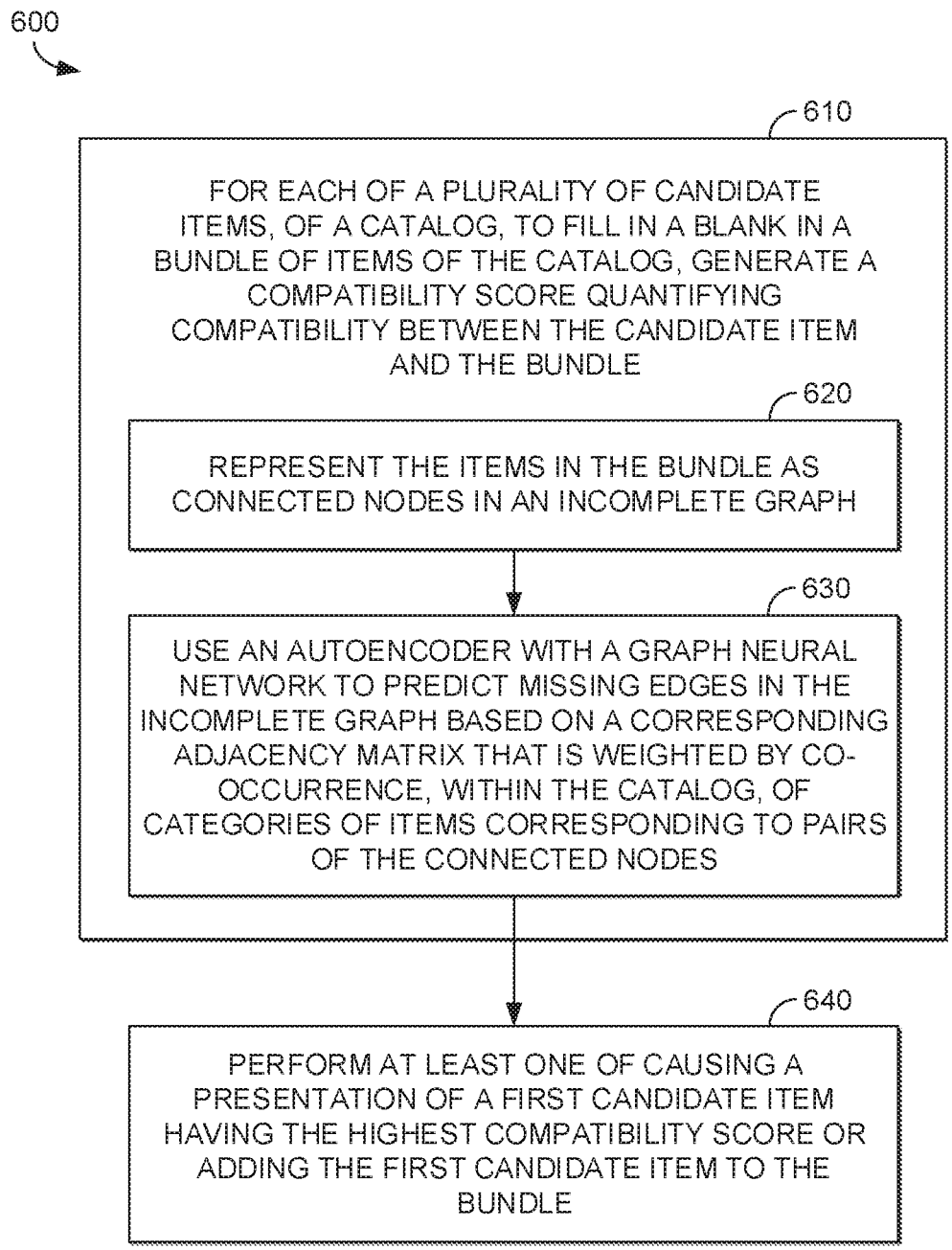
FIG. 6 is a flow diagram showing another method for visual compatibility prediction, in accordance with embodiments of the present invention.

With reference now to FIGS. 5-6, flow diagrams are provided illustrating methods for visual compatibility prediction. Each block of the methods 500 and 600 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning FIG. 5, initially at block 510, a first compatibility score is generated by a first neural network comprising an autoencoder with a graph neural network. The first compatibility score quantifies compatibility between a partial outfit of items and a candidate item to add to the partial outfit. The first compatibility score is jointly conditioned on item category and item context. At block 520, a second compatibility score is generated using a second neural network comprising a style autoencoder. The second compatibility score quantifies visual compatibility between style of the partial outfit and style of the candidate item. At block 530, a learned transformation function is used to combine the first compatibility score and the second compatibility score into a unified visual compatibility score. At block 540, one or more pre-determined actions are performed based on the unified visual compatibility score. For example, the candidate item may be one of a plurality of candidate items, each of which may be evaluated in the context of a fill-in-the-blank task. As such, blocks 510-530 may be performed to generate a unified visual compatibility score for each of the candidate items, and the candidate item having the highest unified visual compatibility score may be presented as a recommendation to fill-in-the blank, automatically bundled into the partial outfit, and/or otherwise.

Turning now to FIG. 6, initially at block 610, for each of a plurality of candidate items, of a catalog, to fill in a blank in a bundle of items of the catalog, generating a compatibility score quantifying compatibility between the candidate item and the bundle. Generating the compatibility score includes, at block 620, representing the items in the bundle as connected nodes in an incomplete graph. Generating the compatibility score also includes, at block 630, using an autoencoder with a graph neural network to predict missing edges in the incomplete graph based on a corresponding adjacency matrix that is weighted by co-occurrence, within the catalog, of categories of items corresponding to pairs of the connected nodes. At block 640, at least one of causing a presentation of a first candidate item having the highest compatibility score or adding the first candidate item to the bundle is performed.

Example Operating Environment

Figure 7:
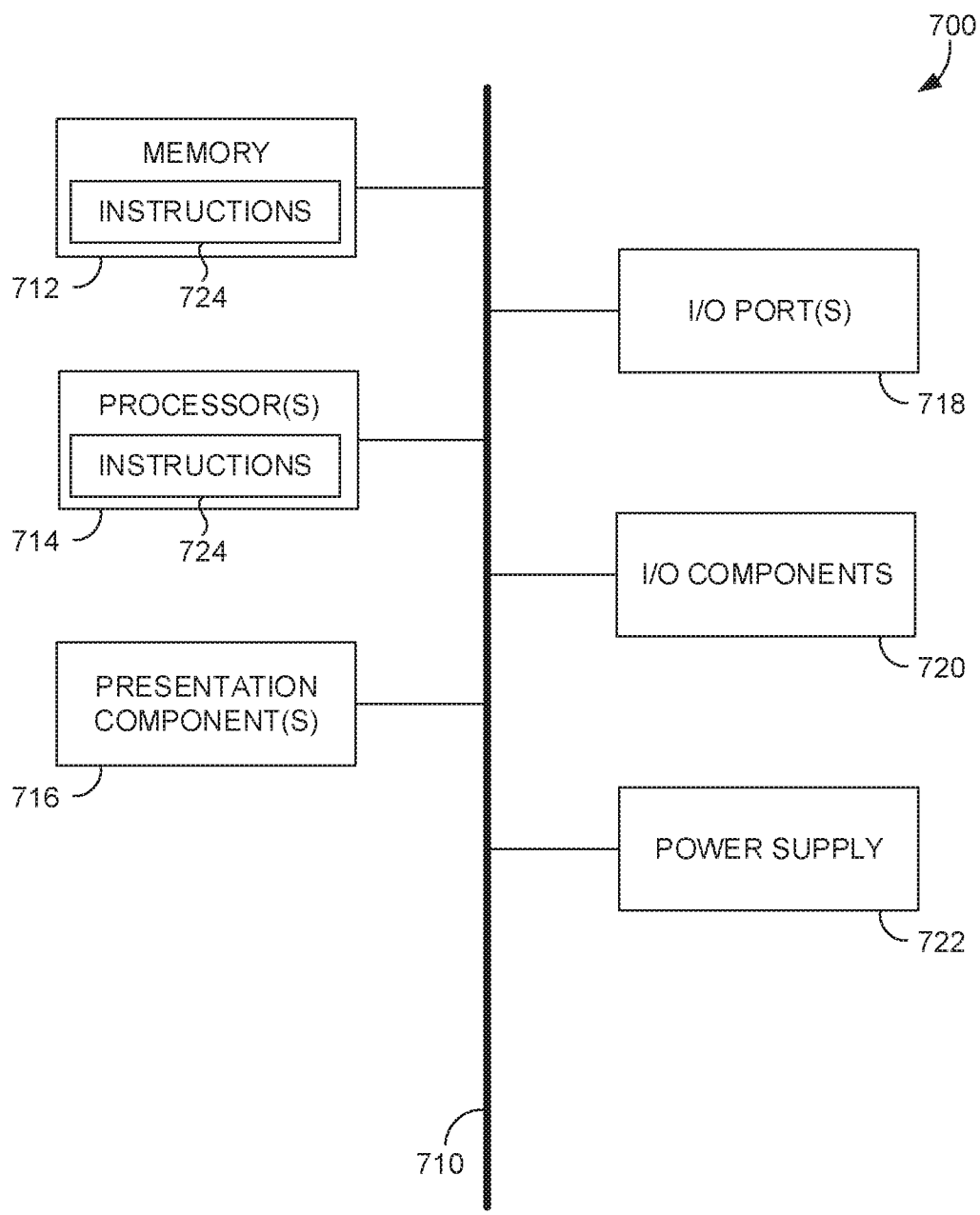
FIG. 7 is a block diagram of an example computing environment suitable for use in implementing embodiments of the present invention.

Having described an overview of embodiments of the present invention, an example operating environment in which embodiments of the present invention may be implemented is described below in order to provide a general context for various aspects of the present invention. Referring now to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-usable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more buses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 700. Computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of computing device 700 to render immersive augmented reality or virtual reality.

Embodiments described herein support visual compatibility prediction. The components described herein refer to integrated components of a visual compatibility prediction system. The integrated components refer to the hardware architecture and software framework that support functionality using the visual compatibility prediction system. The hardware architecture refers to physical components and interrelationships thereof and the software framework refers to software providing functionality that can be implemented with hardware embodied on a device.

The end-to-end software-based visual compatibility prediction system can operate within the visual compatibility prediction system components to operate computer hardware to provide visual compatibility prediction system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the visual compatibility prediction system components can manage resources and provide services for the visual compatibility prediction system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by one or more computing devices, cause the one or more computing devices to perform operations comprising:
   generating a first compatibility score, that quantifies compatibility between a partial outfit of items and a candidate item to add to the partial outfit and is jointly conditioned on item category and item context, based on feeding a representation of category co-occurrence and an incomplete graph representing the items in the partial outfit as connected nodes into a first neural network comprising an autoencoder with a graph neural network;
   generating a second compatibility score that quantifies visual compatibility between style of the partial outfit and style of the candidate item based on feeding node embeddings of the items generated by the first neural network into a second neural network comprising a style autoencoder;
   using a learned transformation function to combine the first compatibility score and the second compatibility score into a unified visual compatibility score; and
   performing one or more pre-determined actions based on the unified visual compatibility score.

2. The one or more non-transitory computer storage media of claim 1, wherein generating the first compatibility score further comprises:
   representing catalog items, including the items in the partial outfit and the candidate item, as nodes of the incomplete graph with edges connecting nodes corresponding to the items in the partial outfit; and
   using the autoencoder with the graph neural network to predict probabilities of missing edges in the incomplete graph.

3. The one or more non-transitory computer storage media of claim 1, wherein generating the first compatibility score further comprises:
   using the autoencoder with the graph neural network to predict pairwise similarities quantifying similarity between pairs of catalog items, the catalog items including the items in the partial outfit and the candidate item; and
   generating the first compatibility score by averaging a set of the pairwise similarities between the candidate item and each of the items from the partial outfit.

4. The one or more non-transitory computer storage media of claim 1, wherein generating the first compatibility score further comprises:
   representing items of a catalog, including the items in the partial outfit and the candidate item, as the incomplete graph; and
   using the autoencoder with the graph neural network to predict missing edges in the incomplete graph based on a corresponding adjacency matrix that is weighted by co-occurrence, within the catalog, of categories of items corresponding to pairs of the connected nodes.

5. The one or more non-transitory computer storage media of claim 1, wherein generating the second compatibility score is further based at least in part on a style embedding for the partial outfit generated by attending over style embeddings for each of the items in the partial outfit.

6. The non-transitory one or more computer storage media of claim 1, wherein generating the second compatibility score further comprises:
   generating, for each of the items in the partial outfit, an outfit style attention based on pairwise similarities predicted by the first neural network decoding the node embeddings of the items; and
   generating, based on feeding the node embeddings of the items generated by the first neural network into the second neural network, a style embedding for the partial outfit weighted by the outfit style attention for each of the items in the partial outfit.

7. The one or more non-transitory computer storage media of claim 1, wherein generating the second compatibility score further comprises:
   using the style autoencoder to predict a first outfit mixture ratio in a style basis corresponding to the partial outfit;
   using the style autoencoder to predict a second outfit mixture ratio in the style basis corresponding to the candidate item being added to the partial outfit; and
   generating the second compatibility score based on a decrease in uncertainty from the first outfit mixture ratio to the second outfit mixture ratio.

8. The one or more non-transitory computer storage media of claim 1, the operations further comprising learning the transformation function using a recurrent neural network controller configured to repetitively predict components of a core unit to form a composite function that combines and weights the first compatibility score and the second compatibility score.

9. The one or more non-transitory computer storage media of claim 1, wherein the one or more pre-determined actions comprise causing a presentation of the unified visual compatibility score or adding the candidate item to the partial outfit.

10. A computerized method comprising:
    for each of a plurality of candidate items, of a catalog, to fill in a blank in a bundle of items of the catalog, generating a compatibility score quantifying compatibility between the candidate item and the bundle, at least in part by:
      representing the items in the bundle as connected nodes in an incomplete graph;
      processing the incomplete graph and a corresponding adjacency matrix that is weighted by co-occurrence, within the catalog, of categories of items corresponding to pairs of the connected nodes using a graph neural network to predict missing edges in the incomplete graph; and
      feeding node embeddings of the items generated by the graph neural network into a second neural network comprising a style autoencoder; and
    performing at least one of causing a presentation of a first candidate item having a highest compatibility score or adding the first candidate item to the bundle.

11. The computerized method of claim 10,
    wherein the autoencoder is configured to predict pairwise similarities quantifying similarity between pairs of items in the catalog, and
    wherein generating the compatibility score quantifying compatibility between the candidate item and the bundle further comprises generating a first compatibility score for the candidate item by averaging a set of the pairwise similarities between the candidate item and each of the items in the bundle.

12. The computerized method of claim 10, wherein generating the compatibility score quantifying compatibility between the candidate item and the bundle is further based at least in part on a style embedding for the bundle generated by attending over style embeddings for each of the items in bundle.

13. The computerized method of claim 10, wherein generating the compatibility score quantifying compatibility between the candidate item and the bundle further comprises:
    generating, for each of the items in the bundle, a bundle style attention based on pairwise similarities predicted by a first neural network comprising the autoencoder with the graph neural network decoding the node embeddings of the items; and
    generating, based on feeding the node embeddings of the items generated by the first neural network into the second neural network comprising a style autoencoder, a style embedding for the bundle weighted by the outfit style attention for each of the items in the bundle.

14. The computerized method of claim 10, wherein generating the compatibility score quantifying compatibility between the candidate item and the bundle further comprises:
    using a style autoencoder, distinct from the autoencoder with the graph neural network, to predict a first outfit mixture ratio in a style basis corresponding to the bundle;
    using the style autoencoder to predict a second outfit mixture ratio in the style basis corresponding to the candidate item being added to the bundle; and
    generating a second compatibility score based on a decrease in uncertainty from the first outfit mixture ratio to the second outfit mixture ratio.

15. The computerized method of claim 10, wherein the compatibility score quantifying compatibility between the candidate item and the bundle is a unified visual compatibility score generated by applying a learned transformation function to combine and weight a first compatibility score and a second compatibility score.

16. The computerized method of claim 10, the method further comprising:
  learning a transformation function using a recurrent neural network controller configured to repetitively predict components of a core unit to form a composite function that combines and weights a first compatibility score and a second compatibility score; and
  applying the transformation function to generate the compatibility score for each of the candidate items.

17. A computer system comprising:
  one or more hardware processors and memory configured to provide computer program instructions to the one or more hardware processors;
  a type and context compatibility score component configured to use the one or more hardware processors to generate a first compatibility score, that quantifies compatibility between a partial outfit of items and a candidate item to add to the partial outfit, based on feeding a representation of category co-occurrence and an incomplete graph representing the items in the partial outfit as connected nodes into a first neural network comprising an autoencoder with a graph neural network;
  an outfit style compatibility scoring component configured to use the one or more hardware processors to generate a second compatibility score based on feeding node embeddings of the items generated by the first neural network into a second neural network comprising a style autoencoder; and
  a visual compatibility scoring component configured to use the one or more hardware processors to generate a recommendation to add one of a plurality of candidate items from a catalog to the partial outfit based on the first compatibility score and the second compatibility score.

18. The computer system of claim 17, wherein the type and context compatibility score component is further configured to use the one or more hardware processors to generate, for each of the candidate items, the first compatibility score by:
  using the autoencoder with the graph neural network to predict pairwise similarities quantifying similarity between pairs of catalog items, the catalog items including the items in the partial outfit and the candidate items; and
  generating the first compatibility score by averaging a set of the pairwise similarities between the candidate item and each of the items from the partial outfit.

19. The computer system of claim 17, wherein the outfit style compatibility scoring component is further configured to use the one or more hardware processors to generate the second compatibility score based on a decrease in uncertainty of an outfit mixture ratio in a style basis on adding the candidate item to the partial outfit.

20. The computer system of claim 17, wherein the visual compatibility scoring component is further configured to use the one or more hardware processors to generate a visual compatibility score for each of the candidate items by applying a learned transformation function to combine and weight the first compatibility score and the second compatibility score.

* * * * *

UNITED STATES PATENT AND TRADEMARK OFFICE
CERTIFICATE OF CORRECTION

PATENT NO. : 11,640,634 B2
APPLICATION NO. : 16/865572
DATED : May 2, 2023
INVENTOR(S) : Kumar Ayush et al.

Page 1 of 1

It is certified that error appears in the above-identified patent and that said Letters Patent is hereby corrected as shown below:

On the Title Page

Column 1 (item (73) Assignee), Delete "INC." and insert -- INC., San Jose, CA (US) --.

Signed and Sealed this
Twenty-seventh Day of June, 2023

Katherine Kelly Vidal
*Director of the United States Patent and Trademark Office*